May 22, 1962     E. J. KEEFE     3,036,200
RESISTANCE WELDING
Filed Jan. 16, 1959

INVENTOR

EDWARD JOHN KEEFE

BY 3,036,200
RESISTANCE WELDING
Edward John Keefe, Eccleston Park, near Prescot, England, assignor to United Kingdom Atomic Energy Authority, London, England
Filed Jan. 16, 1959, Ser. No. 787,171
Claims priority, application Great Britain Jan. 17, 1958
5 Claims. (Cl. 219—92)

This invention relates to resistance welding.

The invention is concerned with the welding of materials which can be affected in their properties by alloying with traces of metals obtained from the welding electrodes. One such material is that known as "Magnox" (see British Patent 776,649) which has its melting point substantially lowered when alloyed with traces of copper.

According to the invention resistance welding is carried out with a protective electricity conducting material between the electrodes and the work-piece, the protective material being of thickness so as to limit heat generation in that material during welding to be less than that generated in the work-piece and so as to prevent the protective material adhering or depositing on the work-piece in making the weld.

The protective material may be in the form of a strip or clip interposed between the work-piece and the electrodes or it may be in the form of a coating to the electrodes.

Figure 1:
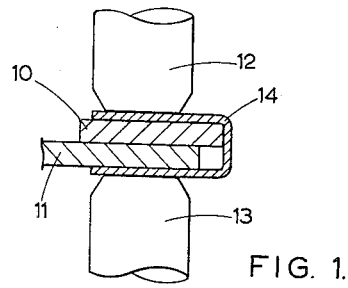
Figure 2:
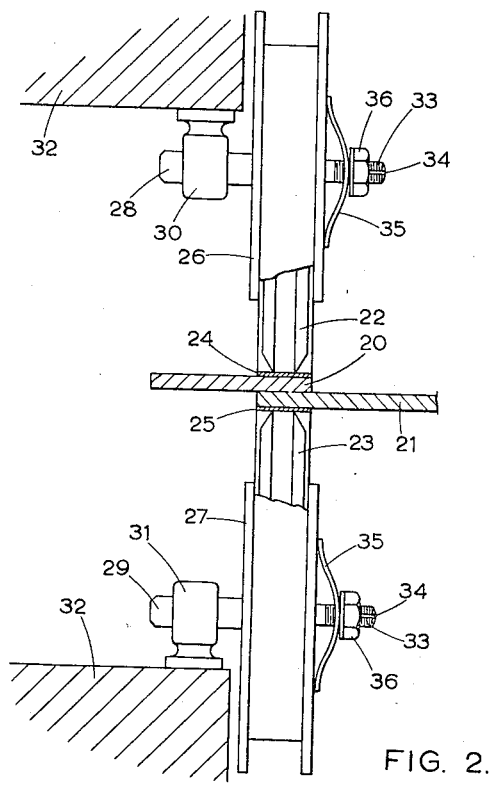

The invention will now be further described with reference to the accompanying drawings wherein FIGS. 1 and 2 are sectional elevations.

In FIG. 1 a strip 10 of "Magnox" having a thickness of .125" and a bracket 11, also of "Magnox" and having a thickness of .125", are compressed together by two copper welding electrodes 12, 13 acting through a mild steel clip 14 which is .003" in thickness. To complete a spot welded joint between the strip 10 and the bracket 11 a welding current is passed between the electrodes 12, 13 so as to traverse the clip 14, the strip 10 and bracket 11. As the clip 14 is thin and in contact with the cool electrodes 12, 13 its temperature never rises to a level which causes it to adhere to the strip 10 or bracket 11. The heat resulting from the welding current is principally generated at the interface of strip 10 and bracket 11 and it is here that the weld takes place. It is seen that the copper electrodes do not come into contact with the magnesium components being welded and hence no deposit of copper from the electrodes can find its way into the mangesium components.

In FIG. 2 a process similar to that described with reference to FIG. 1 is provided for with the exception that the spot welding of FIG. 1 is replaced, in FIG. 2, by seam welding.

In FIG. 2 a strip 20 of "Magnox" is being welded to a plate 21 also of "Magnox." The strip and plate are compressed between two wheel electrodes 22, 23 acting through strips 24, 25 of mild steel .003" thick. The strips 24, 25 are carried on storage drums 26, 27 which are able to rotate on fixed shafts 28, 29 respectively. The shafts are carried in brackets 30, 31 supported on a frame 32 which also supports the wheel electrodes 22, 23. (These electrodes are only shown in part in order to exhibit the drums 26, 27 behind.) The shafts 28, 29 have screwed ends 33 and longitudinal keyways 34. A friction disc 35 is held against each drum 26, 27 by a nut and washer 36. The discs 35 are arranged to key into the keyways 34.

In operation a welding current is passed between the electrodes 22, 23 the components 20, 21, 24 and 26 are drawn between the electrodes. The tapes 24, 25 unwind from the drums 26, 27 and may be collected on following drums (similar to drums 26, 27 but without the friction discs 35) driven by electric motors via slipping clutches.

The invention has an application to finned nuclear reactor fuel elements having "Magnox" sheaths for the addition of supplementary fins and for the attachment of thermocouples.

The present invention is to be distinguished from that in British Patent No. 617,831 wherein there is disclosed the insertion of a strip of electricity conducting material between welding electrodes and a work-piece for the purpose of generating heat externally to the work-piece.

I claim:

1. A method of performing a resistance welding operation on a work-piece wherein a layer of protective electricity conducting material is provided between the welding electrodes and the magnesium alloy work-piece, the protective material being of a thickness substantially in the region of 0.003 inch so as to limit heat generation in that material during welding to a degree less than that generated in the work-piece so as to prevent the protective material adhering or depositing on the work-piece during welding.

2. A method of performing a resistance welding operation as claimed in claim 1 wherein the layer of protective material is in the form of a clip fitting about the work-piece and interposed between the work-piece and the electrodes.

3. A method of performing a resistance welding operation as claimed in claim 1 wherein the layer of protective material is in the form of a coating on the electrodes.

4. A method of performing a resistance welding operation according to claim 1 wherein a seam weld is formed by moving the electrodes over the length of the work piece along the seam to be welded, the layer of protective material being in the form of a tape carried by a pair of reels and the tape being laid down from the reels along the seam on each side and being recovered after passage of the electrodes on two collecting reels.

5. In the process of spot welding a first magnesium alloy member to a second magnesium alloy member with electrodes of a material such as copper which if present as a contaminant in the magnesium alloy reduces its melting point, the improvement of a steel plate member interposed between the electrodes and the members said steel plate member having a thickness in the region of 0.003 inch.

References Cited in the file of this patent
UNITED STATES PATENTS

| | | |
|---|---|---|
| 1,094,141 | Gruchtel | Apr. 21, 1914 |
| 1,267,400 | Gravell | May 28, 1918 |
| 1,308,778 | Gravell | July 8, 1919 |
| 1,563,812 | Waller | Dec. 1, 1925 |
| 1,568,080 | Meadowcroft | Jan. 5, 1926 |
| 2,812,417 | Busse et al. | Nov. 5, 1957 |